June 18, 1935.  T. K. GREENLEE  2,004,940
CONTROL FOR AIR CONDITIONING SYSTEMS
Original Filed Oct. 23, 1931
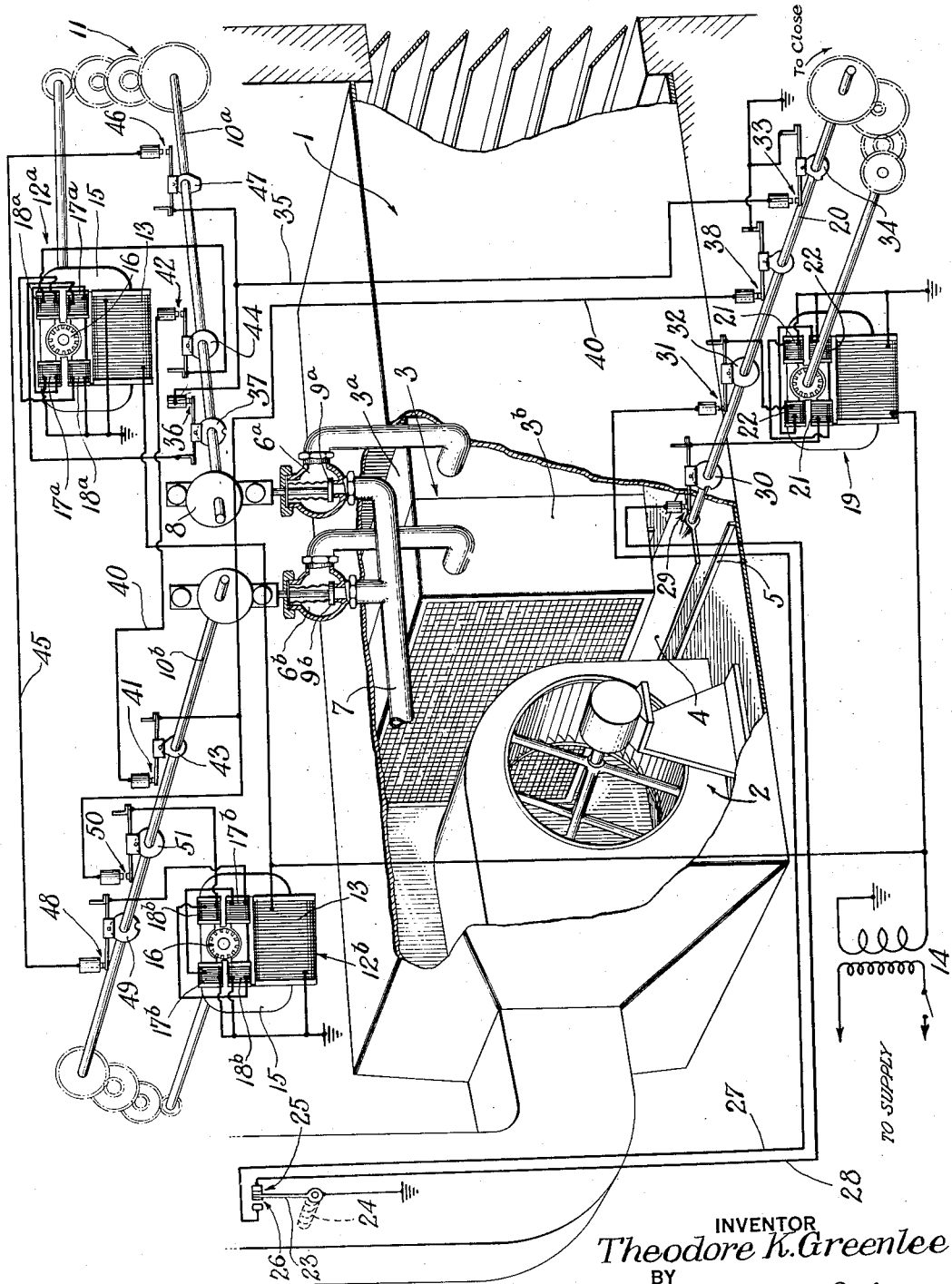
INVENTOR
Theodore K. Greenlee
BY
Chindahl, Parker & Carlson
ATTORNEYS Patented June 18, 1935

2,004,940

UNITED STATES PATENT OFFICE 2,004,940

CONTROL FOR AIR CONDITIONING SYSTEMS

Theodore K. Greenlee, Rockford, Ill., assignor to Howard D. Colman

Application October 23, 1931, Serial No. 570,613
Renewed August 16, 1934

22 Claims. (Cl. 236—38)

This invention relates in general to the actuation of a plurality of power driven devices for changing the condition of a medium, the temperature or other condition of which is to be controlled. More particularly, the invention relates to the manner in which the devices are intercontrolled.

One object is to provide a novel control system in which a regulating unit is controlled by the movements of a supplemental regulator which in turn is controlled by a sensitive control device such as a thermostat and itself produces progressive changes in the effectiveness of said unit.

A more detailed object is to provide a heating system in which the amount of heat delivered to a heater is varied gradually according to changes in the position of a damper controlling a by-pass around the heater and controlled directly by a thermostat.

Another object is to provide a power operated regulating device the direction and extent of movement of which is under the direct control of a sensitive control instrumentality in combination with a second regulating device arranged to be moved in opposite directions as incidents to the movements of said first mentioned device into opposite limiting positions whereby the main regulating device will remain idle while the first mentioned device is disposed between said positions.

A further object is to provide a new and improved regulating system in which the condition of a medium to be controlled is varied progressively by two independently operable devices, one of which produces more accurately graduated regulation than the other and is governed in its operation by a control instrumentality.

The invention also resides in the novel character of the electrically controlled mechanism by which the inter-related controls of the main and auxiliary regulating devices are effected.

Other objects and advantages of the invention will become apparent from the following detailed description taken in conjunction with the accompanying drawing which is a schematic view and wiring diagram of a heating and ventilating system embodying the novel features of the present invention. In this exemplary system, air to be heated is drawn through a duct 1 by a power operated blower 2, part or all of the air being subjected to a heater herein illustrated in the form of coils or radiators 3$^a$ and 3$^b$. The effectiveness of the heater is controllable independently of the amount of heat being supplied thereto at any time and in the present instance, is determined by the proportion of the circulating air current which is by-passed around the heater through a passageway controlled by a damper 4 movable between the full-open position shown in the drawing in which a maximum amount of the air is by-passed around the heater and a position against a stop 5 in which latter position all of the air is forced through the heater.

The amount of heat supplied to the heater is determined in the present instance by valves 6$^a$ and 6$^b$ which control the admission of heating fluid such as steam, to the coils 3 from a feed pipe 7. Each valve is arranged to be opened varying degrees thereby throttling the flow of steam to its heater coil. This is accomplished by a reversible power operator preferably of the type disclosed in the Patent No. 1,944,699, dated January 23, 1934, and comprising generally a cam 8 for moving the valve member 9$^a$ between open and closed positions in a half revolution of a shaft 10$^a$ driven through speed reduction gearing 11 from a motor 12$^a$ preferably having two windings selectively energizable to determine the direction and extent of operation thereof. Herein is shown an induction motor forming per se the subject matter of a copending application by Edgar D. Lilja, Serial No. 540,643 filed May 28, 1931 and having a main field winding 13 constantly energized during operation of the system from a source 14 of alternating current. The stator 15 of the motor provides two poles on opposite sides of a rotor 16 of the squirrel-cage type preferably having its inductor bars exposed at the rotor surface.

Shifting of the magnetic field around the rotor is produced by the well known action of shading coils which constitute the reversing windings above referred to. Each encloses one side portion of one motor pole and comprises, in the present instance, a relatively large number of turns of wire. The coils are arranged in pairs 17$^a$ and 18$^a$ with the coil of each pair connected in series relation and disposed on diametrically opposite sides of the rotor. When the winding formed by the coils 17$^a$ is rendered effectual by short-circuiting the same, the magnetic flux threading the sections of the poles enclosed by these coils will lag behind the flux threading the unshaded sections enclosed by the other coils and produce shifting of the magnetic field around the rotor in a clockwise direction causing rotation of the rotor in the same direction and movement of the valve member 9$^a$ away from its seat. In a similar way, counterclockwise rotation of the rotor and closing of the valve takes place when the coils 18ᵃ are short-circuited with the coils 17ᵃ remaining ineffectual. Owing to the poor single phase characteristics possessed by the motor above described, rotation thereof will cease when the circuits for both pairs of coils are interrupted and the position of the valve 6ᵃ will be maintained by the friction in the speed reducing gearing. The valve 6ᵇ is arranged to be actuated by a similarly constructed electric operator, the parts of which are numbered to correspond with the operator for the valve 6ᵃ.

The damper 4 is arranged to be actuated with a comparatively slow and graduated movement by a reversible electric operator having a motor 19 and constructed similar to the valve operator above described so as to move from open to closed position in a quarter revolution of a shaft 20. Starting of the operator 19 to close the damper is initiated upon short-circuiting of shading coils 21 and reverse movement occurs while the shading coils 22 are effectual.

The damper operator is under the direct control of a sensitive control device in the form of a thermostat 23 responsive to the temperature of the air passing from the discharge end of the duct and having a thermal element 24 arranged to close a switch 25 when the temperature falls below that for which the thermostat is set and to close the switch 26 when the temperature rises above this set value. The common contact of the thermostat switches is connected to the common terminal of the windings 21 and 22 as indicated by grounding on the drawing and the insulated contacts are connected by conductors 27 and 28 to the insulated terminals of the windings 21 and 22 respectively.

Interposed in the conductor 28 is a switch 29 which is held closed by a cam 30 on the shaft 20 except when the damper 4 reaches fully closed position when the switch is opened thereby preventing damage to the damper operator in the event that the thermostat 23 still continues to call for heat. A similar limit switch 31 is interposed in the conductor 27 and arranged to be opened by a cam 32 when the damper reaches open position, as shown in the drawing. With the operator arranged to be controlled as above described, it will be apparent that the thermostat governs the extent as well as the direction of movement of the damper and that any intermediate position of the latter will be maintained while both of the thermostat switches remain open.

The movement of the damper 4 into closed position constitutes an indication that the amount of heat supplied to the heater is insufficient to meet the existing demands on the system, and this movement is utilized to initiate opening or cause further opening of one or both of the valves 6. To this end, a switch 33, which remains open in full open position or any intermediate position of the damper 4, is closed by a cam 34 on the shaft 20 when the damper reaches closed position. One terminal of this switch is connected to the common terminal of the windings 17ᵃ and 18ᵃ as indicated on the drawing by grounding, and the other terminal is connected to the insulated end of the winding 17ᵃ through a conductor 35 having interposed therein a switch 36 which is held closed by a cam 37 on the shaft except when the valve 6ᵃ is fully opened. Thus it will be seen that if the valve 6ᵃ is closed or partially open when the damper 4 reaches closed position, the operator for the valve will be started in a direction to open the valve and this movement will continue until the switch 33 has been opened by movement of the damper away from closed position or until the valve 6ᵃ is fully opened whereupon the limit switch 36 will break the energizing circuit for the winding 17ᵃ.

Likewise, movement of the damper 4 into fully open position is an indication that heating fluid in excess of the amount required to satisfy the existing demands on the system is being delivered to the heater. Accordingly the movement of the damper into and out of open position is utilized to operate a switch 38, the closure of which completes a circuit to the winding 18ᵃ through a conductor 40, a switch 41 and a limit switch 42. For reasons which will later appear, the switch 41 is open for all positions of the shaft 10ᵇ except the valve-closed position when it is held closed by a cam 43. When the circuit last mentioned is completed, the operator for the valve 6ᵃ is started in a direction to close the valve and continues to operate until the damper moves away from open position and opens the switch 38 or until the valve 6ᵃ becomes completely closed whereupon a cam 44 opens the limit switch 42.

From the foregoing it will be apparent that by controlling the direction and extent of movement of the valve 6ᵃ directly from the damper operator and interposing a substantial delay between successive valve-opening and closing movements, the position of the valve and therefore the capacity of the heater to warm the air passing through the duct 1 will be adjusted automatically to satisfy approximately the existing heating requirements. With the supply of heat thus established, a more exact temperature of the discharged air is maintained by varying the position of the damper 4 in response to the direct control of the thermostat 23. Extremely close regulation of the air temperature is thus obtained thereby rendering it unnecessary to vary the amount of heat delivered to the heater except in the case of a substantial change in the heating requirements.

In the event that the demands on the system exceed the capacity of the heating coil 3ᵃ with the valve 6ᵃ fully opened and the damper 4 fully closed, means is provided for withdrawing the operator for the valve 6ᵃ from the control of the switches 33 and 38 and transferring such control to the operator for the valve 6ᵇ so that if the damper 4 continues to remain in closed position, the valve 6ᵇ will be opened. To this end, a branch conductor 45 connected to the conductor 35 at a point between the switches 33 and 36 extends to the insulated terminal of the winding 17ᵇ through the medium of a switch 46 which is maintained open by a cam 47 on the shaft 10ᵃ when the valve 6ᵃ is closed or partially open. Closure of the switch 46 as the valve 6ᵃ reaches open position occurs just prior to the opening of the limit switch 36 and completes the circuit for the winding 17ᵇ through a limit switch 48 which is held closed by a cam 49 on the shaft 10ᵇ except when the valve 6ᵇ is fully opened. The motor 12ᵇ is thus started and the valve 6ᵇ continues to move away from its seat until it has been completely opened or until the switch 33 is opened. In the latter case, the valve 6ᵇ will be stopped after having been partially opened and the amount of heat delivered by the heaters will be determined by the combined effect of two valves 6.

In reducing the amount of heat supplied to the heater, the valves 6ᵃ and 6ᵇ are closed in an order reverse to their opening. To this end, the control of the thermo-responsive mechanism including the damper 4 is transferred from the operator for the valve 6b back to the operator for the valve 6a upon opening of a limit switch 50 by a cam 51 and closure of the transfer switch 41 as the valve 6b becomes fully closed. Thereafter, continued closure of the switch 38 initiates closure of the valve 6a by energization of the winding 18a through the switch 41 and the then closed limit switch 42. In the initial opening movement, the limit switch 36 will be closed and the transfer switch 46 opened again placing the valve-opening winding 17a within the control of the thermo-responsive switch 33.

From the foregoing it will be apparent that when the existing demands on the system require that the valve 6b be partially open, the latter will move toward closed position while the damper 4 is fully opened, will move toward open position when the damper is fully closed, and will be held in partially opened position while the damper is disposed in an intermediate position. In this way the movements of the damper are utilized to determine the direction and extent of movement of the valve 6b the same as in the case of the valve 6a. With such arrangement of transfer mechanism, the combined effect of a plurality of heating coils is controlled in accordance with the movements of the regulating damper 4 and a more accurate regulation of the amount of heat supplied to the main heater is thereby effected.

By intercontrolling the two regulators in the manner contemplated by the present invention, it will be observed that a high degree of accuracy is obtained in regulating the condition of the controlled medium. The two regulating members operate independently, one of them, that is, the valve 6a, operating with a progressive action to vary the capacity of the conditioning device approximately in accordance with the demands on the system as determined by the time intervals during which the other member, that is, the damper, remains at or near two positions which are spaced to correspond approximately to the range of effective operation of the damper. The capacity of the conditioning device remains fixed while the damper is moving back and forth to effect a more accurately graduated rate of regulation for any given position of the valve. Intercontrol of the regulators in this manner and the attainment of such high accuracy is due in part to the use of a control instrument which responds to a continuation of the unsatisfactory condition to be changed as distinguished from an aggravation of such condition. Thus, a prolonged continuance of any temperature below that for which the thermostat is set to respond will cause movement of the damper to the maximum heating position followed by a progressive increase in the heater capacity.

I claim as my invention:

1. A system for controlling the temperature of an air current passing through a circulating duct comprising, in combination, a heater in said duct, a by-pass around said heater, a damper controlling said by-pass to determine the proportion of the air current subjected to said heater, a power operator for said damper having electric motor driving means with two windings selectively energizable to determine the direction and extent of movement of said damper between open and closed positions, a thermostat responsive to the temperature of the heated air and having switches controlling circuits through said windings, a valve controlling the amount of heat delivered to said heater, a power operator for said valve having electric motor driving means with two windings selectively energizable to determine the direction and extent of movement of said valve, and two switches actuated by said damper operator and controlling circuits for said last mentioned windings, one switch being closed when said damper reaches closed position and the other switch being closed when the damper reaches open position.

2. A heating system comprising, in combination, a heating radiator, a valve controlling the flow of heating medium to said radiator, an electrically driven operator for said valve having two windings selectively energizable to cause opening or closing of the valve varying distances, a power driven regulating device movable between two limit positions and operable independently of the amount of heating medium supplied to said radiator to vary the heating effect thereof, a thermostat responsive to the temperature of the air warmed by said radiator and directly controlling the operation of said device, a switch controlling the circuit for one of said windings adapted to be closed and opened respectively as incidents to the movement of said device into and out of closed position, the closure of said last mentioned switch serving to initiate opening of said valve, and a switch adapted to be closed and opened respectively upon the movement of said damper into and out of a predetermined open position, the closure of the latter switch causing energization of the other of said windings whereby to initiate movement of said valve toward closed position.

3. In a heating system, the combination of a duct having two passageways for the flow of air therethrough, a heater in one of said passageways, a damper controlling the other passageway to determine the proportion of air by-passed around said heater, a power driven operator for said damper, a thermostat directly controlling the operation of said operator for varying the position of the damper in accordance with changes in the temperature of the heated air, and means responsive to the movement of said damper into closing position to increase the effectiveness of said heater in progressively changing increments and to decrease the effectiveness thereof when said damper approaches a predetermined open position while maintaining the prevailing condition of the heater while said damper is moving between said positions.

4. In a heating system, the combination of a heater for imparting varying amounts of heat to a current of circulating air, a thermostat, a damper responsive to said thermostat and movable in opposite directions between two limit positions to vary the effectiveness of said heater in progressively increasing or decreasing increments, and an operator controlled by the movements of said damper and acting to initiate turning on of the heater in progressive increments when said damper reaches one of said positions and to initiate turning off of the heater in progressive increments when said damper reaches the other of said positions, the heating capacity of the heater remaining unchanged while said damper is disposed between said positions.

5. In a heating system, the combination of a heater, a device movable to vary progressively the amount of heat supplied to said heater, a regulator operable independently of the position of said device and while the position of the latter remains fixed, to vary the heating effect of the heater, a thermostat controlling said regulator, to effect progressive movements thereof, and means controlled in response to the movements of said regulator for effecting independent progressive movement of said device while the position of said regulator remains fixed.

6. In a system for heating a current of air, the combination of a heater, a regulating device for progressively varying the amount of heat supplied to said heater, a second regulating device for progressively varying the effectiveness of said heater independently of the position of said device and while the position of the latter remains fixed responsive to temperature changes of the heated air for variably controlling the position of said second device, and means controlled by the movements of said second device for varying progressively the position of said first mentioned device.

7. In a temperature control system, the combination of a heater, a power operated regulator for varying progressively the amount of heat supplied to said heater, a supplemental power operated regulator for varying progressively the effectiveness of said heater while said first mentioned regulator is idle and the supply of heat to said heater remains substantially constant, a thermostat controlling the direction and extent of operation of said supplemental regulator, and means actuated by said supplemental regulator controlling said first mentioned regulator to determine the direction and extent of operation of the latter.

8. In a temperature control system, the combination of a heater, a valve controlling the admission of heating fluid to said heater, a power operator for actuating said valve, two switches controlling said operator and selectively operable to cause movement of said valve toward closed or open position respectively depending on which of said switches is closed, thermostatically controlled means for controlling the closure of said switches and for interposing a substantial delay between the opening of one switch and the closure of the other, and means for varying the effectiveness of said heater during said delay.

9. In an air conditioning system, the combination of a conditioning unit, a valve variably controlling the flow of fluid to said unit, a power operator for actuating said valve to produce varying degrees of valve-opening and maintain the position of the valve when stopped with the valve partially opened, a by-pass damper movable between substantially opened and closed positions to vary the effectiveness of said unit while said valve remains in any position, a sensitive control device, an operator for actuating said damper controlled by said device, and means for initiating operation of said valve operator in one direction as an incident to the movement of said damper into open position and in the opposite direction as an incident to the movement of said damper into closed position.

10. In an air conditioning system, the combination of a valve member movable between two limit positions, an electric operator for driving said member in opposite directions through a relatively wide range of movement and operable to maintain the position of the member when idle, a sensitive control device controlling said operator to determine the direction and extent of movement of said member, a second valve member, an operator for moving the latter in opposite directions, and switching means controlled in accordance with the movements of said member and controlling said second operator to initiate movement of said second member in one direction as said first member reaches one limit position and in the opposite direction when said other limit position is reached, said last mentioned means permitting said second operator to remain idle while said first mentioned valve member is disposed between said limit positions.

11. In an air conditioning system, the combination of an air conditioning unit, a device for variably controlling said unit, an operator for actuating said device in progressive increments including an electric motor having two windings selectively energizable to determine the direction and extent of movement of said device, a second device variably controlling the operation of said unit, a sensitive control element controlling said second device when the latter is disposed between two limit positions, two circuits, one for each of said windings and each having a control switch therein and means for closing and opening one of said switches as an incident to the movement of said second device into and out of one limit position and closing and opening the other switch as an incident to the movement of the second device into and out of said other limit position.

12. In a temperature control system, the combination of a duct having two passageways therethrough, a temperature control unit disposed in one of said passageways, a damper disposed in said other passageway and movable to vary the effective area of the last mentioned passageway only, a sensitive control device such as a thermostat controlling said damper to effect progressive changes in the area of said second passageway and automatically operable means for decreasing progressively the effectiveness of said unit when said damper passes beyond a predetermined position in one direction and for increasing progressively the effectiveness of said unit when the damper moves beyond a predetermined position in the other direction.

13. In a system of the character described, the combination of a valve member, a motor driven operator for imparting slow and graduated movements to said member for moving the same in opposite directions between opposite limit positions, said operator when idle maintaining said member in any intermediate position, a circulating air duct having a damper therein movable in opposite directions between limit open and closed positions, an electrically driven operator for actuating said damper with slow and graduated movements, a sensitive control device governing the direction and extent of movement of said last mentioned operator, and switching means controlling said first mentioned operator and actuated in the movement of said damper, said switching means acting to initiate operation of said first mentioned operator in one direction upon movement of said damper into one of said limit positions and to interrupt such operation immediately upon reverse movement of said damper whereby said member is held in an intermediate position by its operator.

14. The combination of two independently operable regulating devices each movable in opposite directions, a thermostat, and electric motor driving means operable to move one of said devices varying distances back and forth between two limit positions and with slow and graduated movement under the control of said thermostat until one of said limit positions is reached and then maintain such position and initiate similar movement of the other device in a corresponding direction, said driving means acting, upon a reversal of temperature conditions, to initiate reverse movement of said first mentioned device and to maintain said second device in the position in which it was disposed at the time of such reversal.

15. The combination of two independently operable devices each movable in opposite directions, an automatically operable control element, and power driving means controlled by said element and operable to impart slow and graduated movements to said devices, said driving means operating to move one of said devices back and forth varying distances between two limit positions until one of such positions is reached whereupon to interrupt such movement and initiate a slow and graduated movement of the other device in a corresponding direction and said driving means acting, upon a reversal of the conditions to which said element responds, to initiate reverse movement of the first device and maintain the intermediate position in which said second device was disposed at the time of such change.

16. In an air conditioning system, the combination of a device for changing the condition of the air exposed thereto, a regulating element movable in opposite directions to vary the effectiveness of said conditioning device slowly and progressively, a regulating member movable slowly back and forth between two spaced positions to vary the effectiveness of said conditioning device progressively and at a relatively slow rate more accurately graduated than said element, means responsive to changes in the condition of the air to govern the direction and extent of movement of said member, and means responsive to the movement of said member and operating to cause independent movement of the element in one direction during the time interval that said member is disposed substantially in one of said positions and in the opposite direction while the member is disposed in the other of said positions, said last mentioned means acting during movement of the member between said positions to maintain the element in the position in which it was disposed at the time of movement of the member to an intermediate position.

17. In an air conditioning system, the combination of a device for changing the condition of the air exposed thereto, a regulating member movable back and forth to effect an accurately graduated variation in the effectiveness of said conditioning device, means responsive to changes in the condition of the air to govern the direction and extent of movement of said member, and an auxiliary regulating element for varying the capacity of said device independently of said member, and power driven actuating means for said element operating automatically, when said member is disposed beyond two spaced positions after moving in opposite directions, to cause movement of said element in opposite directions respectively, the spacing of said positions corresponding substantially to the range of effectiveness of said member.

18. In a system of the class described, the combination of a regulating member movable back and forth between two spaced positions to effect progressive and accurately graduated variations in the condition of a medium, the condition of which is to be controlled, a regulating element movable in opposite directions to vary the condition of said medium at a graduated rate, means responsive to changes in the condition of the conditioned medium to govern the direction and extent of movement of said member while the position of said element remains substantially fixed, and power actuated means operating to cause movement of said element in one direction during the time that said member is disposed substantially in one of said positions and in the opposite direction while the latter member is substantially in the other of said positions.

19. In a system of the class described, the combination of a regulating member movable back and forth to effect progressive and graduated variations in the condition of a medium, the condition of which is to be controlled, a regulating element movable in opposite directions to change the condition of said medium, means responsive to changes in the condition of the conditioned medium to govern the direction and extent of movement of said member while said element remains substantially idle, and means governing the operation of said element and operating to initiate movement thereof in one direction when said member reaches a predetermined position while moving in one direction and to initiate movement of the element in the opposite direction when the member reaches a different position spaced from said predetermined position, said positions being spaced apart a distance corresponding approximately to the effective range of operation of said member.

20. In a temperature control system, the combination of a device for changing the temperature of the air exposed thereto, a regulating member movable back and forth between two positions for effecting progressive and graduated variations in the operating capacity of said device between maximum and minimum limits, an independently operable element movable in opposite directions to increase and decrease the temperature of said medium independently of the position of said member, means responsive to changes in the air temperature to govern the direction and extent of movement of said member, and power driven means operating upon movement of said member into said position of maximum capacity to initiate movement of said element in a direction to produce a corresponding temperature change, said last mentioned means operating when the member moves into said position of minimum capacity to initiate movement of said element in the reverse direction while maintaining the position of the element fixed when said member is disposed between said positions.

21. In a temperature control system, the combination of a regulating element movable in opposite directions to vary progressively the temperature of a medium the temperature of which is to be controlled, a regulating member movable back and forth between two spaced positions to effect progressive and accurately graduated variations in the temperature of said medium independently of the position of said element, thermostatically controlled means responsive to temperature changes of said medium and operating to move said member in one direction during the continuance of the medium temperature below a predetermined controlling value, said means operating to move the member reversely during the continuance of the medium temperature above a predetermined value, and means governing the movement of said element and operating to cause movement of the element in one direction during the time interval that said member is disposed beyond one of said positions and in the opposite direction while the member is disposed beyond the other of said positions, said last mentioned means acting during movement of the member between said positions to maintain the element substantially in the position in which it was disposed when the member moved to the intermediate position.

22. In a control system, the combination of a regulating member movable back and forth at a graduated rate, a regulating element movable in opposite directions, a power operator for said member automatically controlled and operating to vary progressively the direction and extent of movement of said member while said element remains idle, and independent power driven means controlled in response to the movements of said member and operating to cause movement of said element in one direction when said member moves in one direction to a predetermined position and in the opposite direction when the member moves in the opposite direction to a position spaced from the first position, the spacing of said positions corresponding approximately to the range of effective operation of said member.

THEODORE K. GREENLEE.

CERTIFICATE OF CORRECTION.

Patent No. 2,004,940. June 18, 1935.

THEODORE K. GREENLEE.

It is hereby certified that error appears in the printed specification of the above numbered patent requiring correction as follows: Page 4, first column, line 16, claim 6, after "fixed" insert the comma and words , a thermostat; and that the said Letters Patent should be read with this correction therein that the same may conform to the record of the case in the Patent Office.

Signed and sealed this 6th day of August, A. D. 1935.

Leslie Frazer

Acting Commissioner of Patents.

(Seal)